(12) United States Patent
Luttmer (10) Patent No.: US 10,300,973 B2
(45) Date of Patent: May 28, 2019

(54) TAILLIGHT ASSEMBLY FOR A MOTORCYCLE

(71) Applicant: Bernard Luttmer, Glencoe, OK (US)

(72) Inventor: Bernard Luttmer, Glencoe, OK (US)

( * ) Notice: Subject to any disclaimer, the term of this patent is extended or adjusted under 35 U.S.C. 154(b) by 19 days.

(21) Appl. No.: 15/676,444

(22) Filed: Aug. 14, 2017

(65) Prior Publication Data

US 2019/0047650 A1 Feb. 14, 2019

(51) Int. Cl.
| | | |
|---|---|---|
| *B62J 6/04* | (2006.01) |
| *B60Q 1/30* | (2006.01) |
| *B60Q 1/34* | (2006.01) |
| *B60Q 1/44* | (2006.01) |
| *B62J 6/00* | (2006.01) |
| *B62J 1/28* | (2006.01) |
| *F21S 43/20* | (2018.01) |
| *F21S 43/27* | (2018.01) |
| *F21S 41/141* | (2018.01) |
| *F21Y 115/00* | (2016.01) |

(52) U.S. Cl.
CPC ........ *B62J 6/04* (2013.01); *B60Q 1/30* (2013.01); *B60Q 1/34* (2013.01); *B60Q 1/44* (2013.01); *B62J 1/28* (2013.01); *B62J 6/005* (2013.01); *F21S 41/141* (2018.01); *F21S 43/26* (2018.01); *F21S 43/27* (2018.01); *F21Y 2115/00* (2016.08)

(58) Field of Classification Search
CPC ...... B62J 6/04; B62J 6/005; B62J 1/28; F21S 43/27; F21S 41/141; F21S 43/26; F21S 48/115; F21S 48/2206; F21S 48/2212; B60Q 1/30; B60Q 1/34; B60Q 1/44; F21Y 2115/00
See application file for complete search history.

(56) References Cited

U.S. PATENT DOCUMENTS

| | | | | |
|---|---|---|---|---|
| 2,586,643 | A * | 2/1952 | Garlow | .................... B60Q 1/34 362/494 |
| 3,344,264 | A * | 9/1967 | Perkins | .................. B63B 45/00 362/237 |
| 3,574,396 | A | 4/1971 | Bird | |
| 3,696,334 | A * | 10/1972 | Demeter | .................. B62J 6/005 362/473 |
| 3,788,532 | A | 1/1974 | Bish | |
| 4,011,443 | A * | 3/1977 | Smith | ........................ B62J 6/00 362/549 |

(Continued)

*Primary Examiner* — Y M. Lee
(74) *Attorney, Agent, or Firm* — Dunlap Codding, P.C.

(57) ABSTRACT

A taillight assembly including a support member, a right light assembly, a right lens assembly, left light assembly, and a left lens assembly. The right and left light assemblies are mounted to a light supporting portion of the support member. The right assembly includes a first light source oriented to direct a first beam of light in a rearward direction and a second light source oriented to direct a second beam of light in a rightward direction. The left light assembly includes third light source oriented to direct a third beam of light in rearward direction and a fourth light source oriented to direct a fourth beam of light in a leftward direction. The right and left lens assemblies are mounted to the light supporting portion to house the right and left light assemblies, respectively, and cooperate to disperse the first, second, third, and fourth beams of light 270 degrees horizontally.

8 Claims, 6 Drawing Sheets

(56) References Cited

U.S. PATENT DOCUMENTS

| | | | |
|---|---|---|---|
| 5,384,693 A * | 1/1995 | Schwaller | B60Q 1/30 362/545 |
| 5,406,465 A | 4/1995 | Farchione | |
| 6,957,903 B2 | 10/2005 | Arakawa et al. | |
| 7,114,836 B2 | 10/2006 | Sheu et al. | |
| 8,382,137 B2 | 2/2013 | Nusret | |
| 9,322,545 B2 | 4/2016 | Wansor | |
| 2003/0063472 A1 | 4/2003 | Ban et al. | |
| 2007/0216524 A1 | 9/2007 | Yamamoto | |
| 2009/0134992 A1 | 5/2009 | Pacheco et al. | |
| 2009/0184507 A1 | 7/2009 | Leisch | |

* cited by examiner

TAILLIGHT ASSEMBLY FOR A MOTORCYCLE

BACKGROUND

Motorcycle taillights (brake lights and running lights) and turn lights are typically external components mounted to frames or fenders. Taillights are provided as a reminder to following and nearby motorists of a motorcyclist's presence, and turn signals are provided to alert following motorists of a motorcyclist's upcoming movements. Traditionally, motorcycle taillights are mounted below the seat of the motorcycle. This placement results in an illumination that is close to the ground and often difficult to see by following motorists. Motorcycle back rests with illumination assemblies extending above the motorcycle seat have been developed. However, such assemblies provide only rearward illumination and are therefore less likely to be noticed by motorists driving alongside a motorcyclist. To this end, a need exists for a taillight assembly extending above a motorcycle seat and providing increased horizontal illumination. It is to such a taillight assembly that the inventive concepts disclosed herein are directed.

DETAILED DESCRIPTION OF EXEMPLARY EMBODIMENTS

In the following detailed description of embodiments of the inventive concepts, numerous specific details are set forth in order to provide a more thorough understanding of the inventive concepts. However, it will be apparent to one of ordinary skill in the art that the inventive concepts disclosed and claimed herein may be practiced without these specific details. In other instances, well-known features have not been described in detail to avoid unnecessarily complicating the instant disclosure.

As used herein, the terms "comprises," "comprising," "includes," "including," "has," "having" or any other variation thereof, are intended to cover a non-exclusive inclusion. For example, a process, method, article, or apparatus that comprises a list of elements or steps is not necessarily limited to only those elements or steps and may include other elements, steps, or features not expressly listed or inherently present therein.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B is true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Throughout this disclosure and the claims, the terms "about," "approximately," and "substantially" are intended to signify that the item being qualified is not limited to the exact value specified, but includes some slight variations or deviations therefrom, caused by measuring error, manufacturing tolerances, stress exerted on various parts, wear and tear, or combinations thereof, for example.

The use of the term "at least one" will be understood to include one as well as any quantity more than one, including but not limited to each of, 2, 3, 4, 5, 10, 15, 20, 30, 40, 50, 100, and all integers there between. The term "at least one" may extend up to 100 or 1000 or more, depending on the term to which it is attached; in addition, the quantities of 100/1000 are not to be considered limiting, as higher limits may also produce satisfactory results. Singular terms shall include pluralities and plural terms shall include the singular unless indicated otherwise.

The term "or combinations thereof" as used herein refers to all permutations and/or combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment, although the inventive concepts disclosed herein are intended to encompass all combinations and permutations including one or more of the features of the embodiments described herein.

Figure 1:
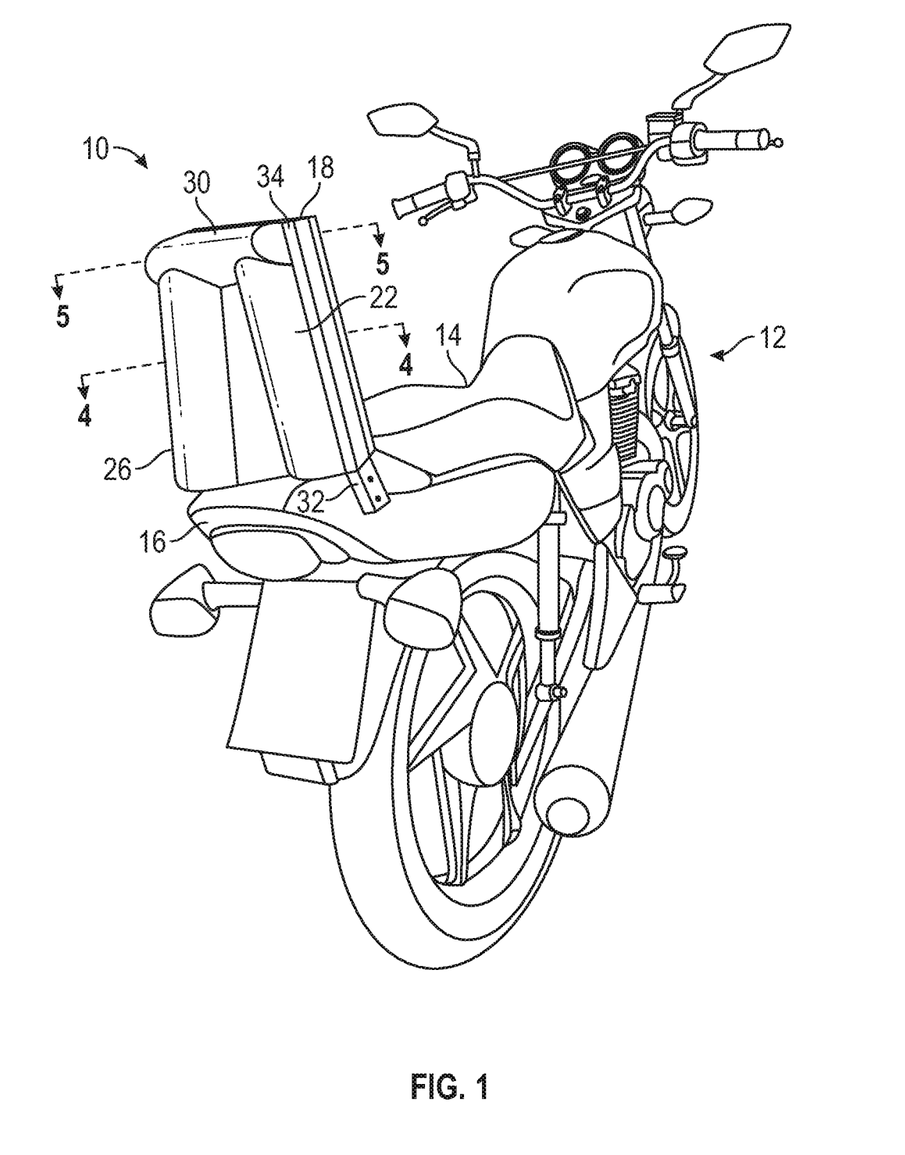
FIG. 1 is a rear perspective view of a taillight assembly constructed in accordance with the inventive concepts disclosed herein shown mounted to a seat of a motorcycle.

Referring now to FIGS. 1-5, a taillight assembly 10 for a motorcycle, such as motorcycle 12, and constructed in accordance with the inventive concepts is illustrated. As shown in FIG. 1, the motorcycle 12 includes a seat 14 and a rear 16, to which the taillight assembly 10 is generally mounted. The taillight assembly 10 includes a support member 18, a right light assembly 20 (FIG. 4), a right lens assembly 22, left light assembly 24 (FIG. 4), a left lens assembly 26, an upper light assembly 28 (FIG. 5), and an upper lens assembly 30. As discussed below in further detail, the right and left light assemblies 20 and 24 include specially oriented light sources, and the right and left lens assemblies 22 and 26 cooperate to disperse light emitted from the light sources approximately 270 degrees horizontally. Before a further description of the light source assemblies is provided, a more detailed description of the support member 18 is discussed.

Figure 2:
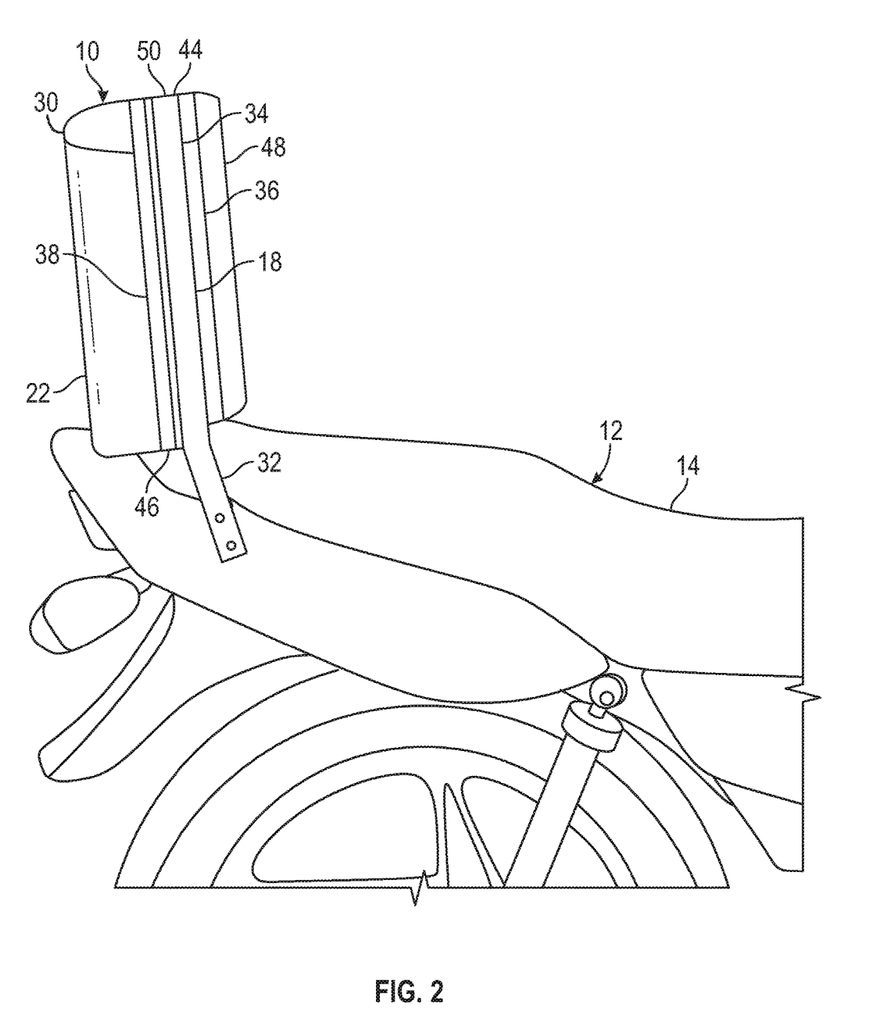
FIG. 2 is front perspective view of the taillight assembly of FIG. 1 shown mounted to the seat of the motorcycle.
Figure 3:
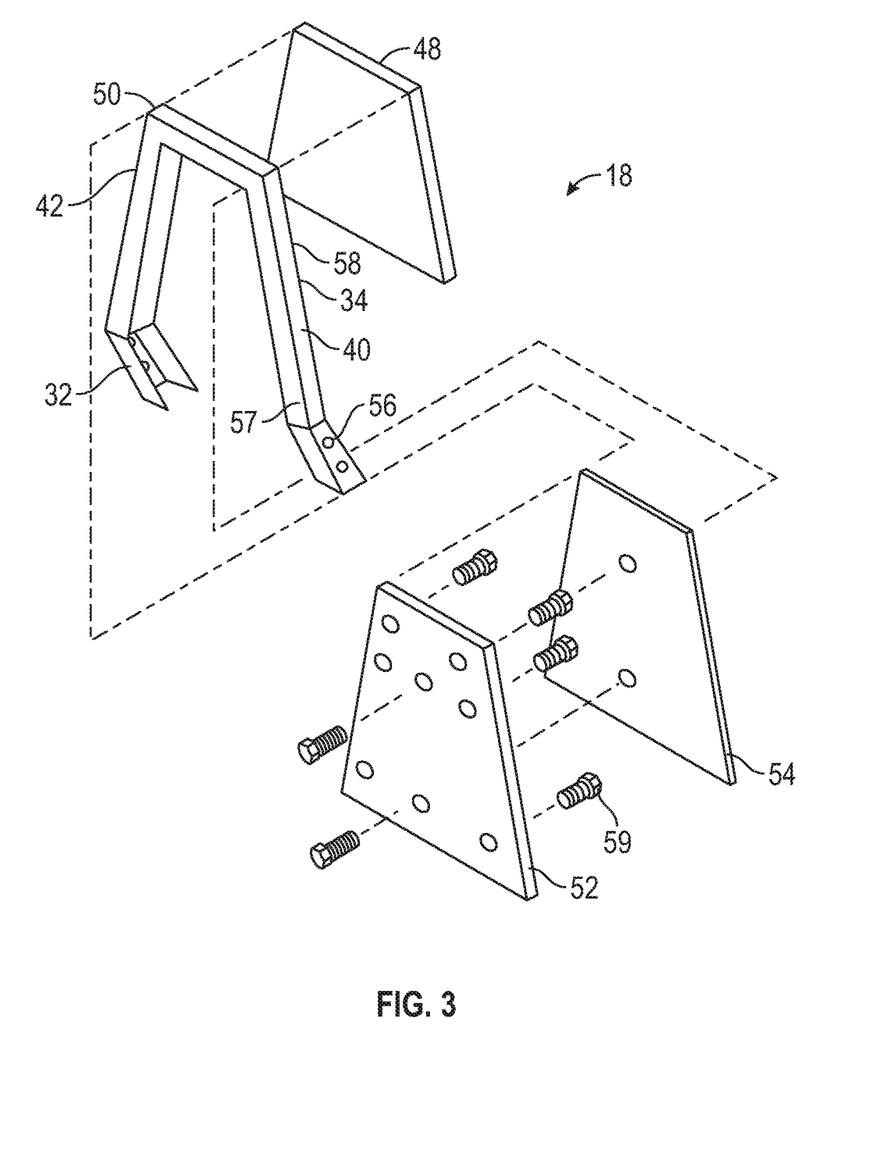
FIG. 3 is an exploded, perspective view of the taillight assembly of FIG. 1.

As shown in FIGS. 1-3, the support member 18 has a mounting portion 32 and a light supporting portion 34. The mounting portion 32 is mountable to the rear 16 of the motorcycle 12 in a way that the light supporting portion 34 extends above the seat 14. The light supporting portion 34 has a front side 36, a rear side 38, a right side 40, a left side 42, an upper end 44, and a lower end 46. The right and left light assemblies 20 and 24 and the right and left lens assemblies 22 and 26 are connected to the rear side 38 of the light supporting portion 34. One having ordinary skill should appreciate that the support member 18 may be connected to a motorcycle in a variety of ways, depending on the type of motorcycle.

For example, but not by way of limitation, in one embodiment (best shown in FIG. 3), the light supporting portion 34 of the support portion 18 includes a mounting frame 50, a circuit board mount 52, and a heat absorbing member 54. The mounting portion 32 extends from the mounting frame 50 and includes a plurality of mounting holes 56 for connecting to the motorcycle 12 with a plurality of fasteners. The circuit board mount 52 and the heat absorbing member 54 connect to a rear side 57 of the mounting frame 50 using a plurality of fasteners. The fasteners may be, but are not limited to being, bolts, adhesives, clamps, or any other suitable means of fastening. In one embodiment, the fasteners are screws, such as screws 59. The mounting frame 50 may be comprised of tubular bars made of a variety of materials including, but not limited to aluminum, steel, and other suitable material. The heat absorbing member 54 may also be comprised of aluminum, steel, or other suitable material. The light supporting portion 34 may further include a back rest 48 connected to a front side 58 of the mounting frame 50. The circuit board mount 52 and the back rest 48 may be comprised of a variety of materials including, but not limited to, wood or synthetic material, such as a wood-plastic composite. The back rest 48 may further be provided with a cushion and a cover.

Figure 4:
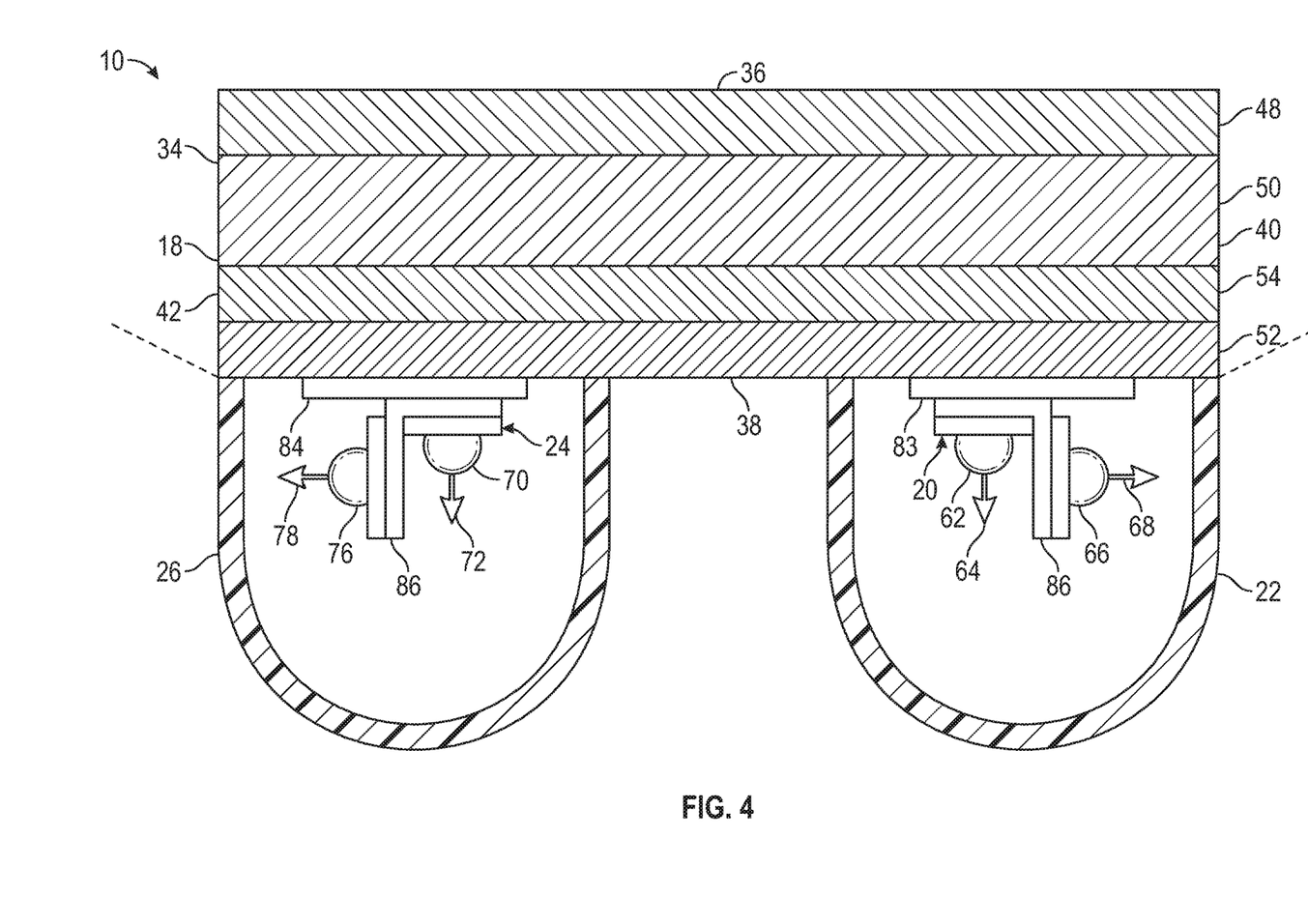
FIG. 4 is a cross-sectional view taken along line 4-4 of FIG. 1.

As best shown in FIG. 4, the right light assembly 20 is mounted to the light supporting portion 34 of the support member 18 adjacent the right side 40 of the light supporting portion 34. The right light assembly 20 includes a first light source 62 oriented to direct a first beam of light 64 in a rearward direction and a second light source 66 oriented to direct a second beam of light 68 in a rightward direction. The right lens assembly 22 is mounted to the light supporting portion 34 of the support member 18 to house the right light assembly 20 and disperse the first beam of light 64 and the second beam of light 68.

As shown in FIG. 4, the left light assembly 24 is mounted to the light supporting portion 34 of the support member 18 adjacent the left side 42 of the light support portion 34. The left light assembly 24 includes a third light source 70 oriented to direct a third beam of light 72 in a rearward direction and a fourth light source 76 oriented to a direct a fourth beam of light 78 in a leftward direction. The left lens assembly 26 is mounted to the light supporting portion 34 of the support member 18 to house the left light assembly 24 and disperse the third beam of light 72 and the fourth beam of light 78. Although not required, it should be appreciated that a plurality of right and left light assemblies may be mounted to the light supporting portion 34, as shown in FIG. 6 and discussed in further detail below.

Figure 5:
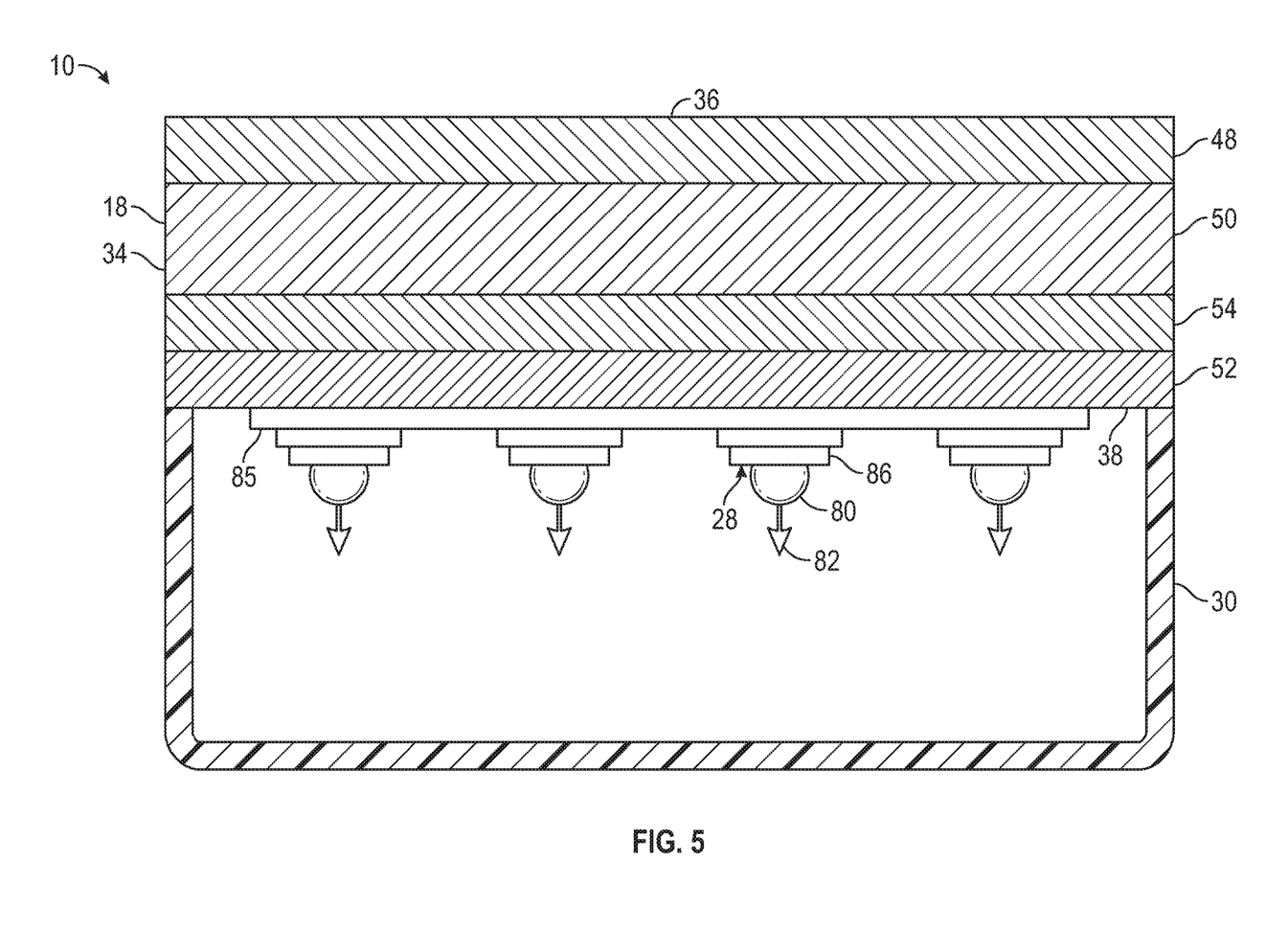
FIG. 5 is a cross-sectional view taken along line 5-5 of FIG. 1.

As shown in FIG. 5, the upper light assembly 28 is mounted to the light supporting portion 34 of the support member 18 above (see FIG. 1) the right light assembly 20 and the left light assembly 24. The upper light assembly 28 includes a fifth light source 80 oriented to direct a fifth beam of light 82 in a rearward direction. The upper lens assembly 30 is mounted to the light supporting portion 34 of the support member 18 to house the upper light assembly 28 and disperse the fifth beam of light 82. FIG. 5 shows a plurality of upper light assemblies mounted to the light supporting portion 34. However, it should be appreciated that the taillight assembly 10 may include one upper light assembly.

In the embodiment shown in FIGS. 4 and 5, the first, second, third, fourth and fifth light sources 62/66/70/76/80 are each a light emitting diode (LED). The right, left, and upper light assemblies 20/24/28 may each include a circuit board, such as circuit boards 83, 84, and 85 mounted to the light supporting portion 34 and a plurality of heat sinks, such as heat sinks 86, for removing excess heat generated from the light sources 62/66/70/76/80 connected to the circuit boards 83/84/85. A thermal grease may be applied between the light sources and the heat sinks to further remove heat generated by the light sources.

Figure 6:
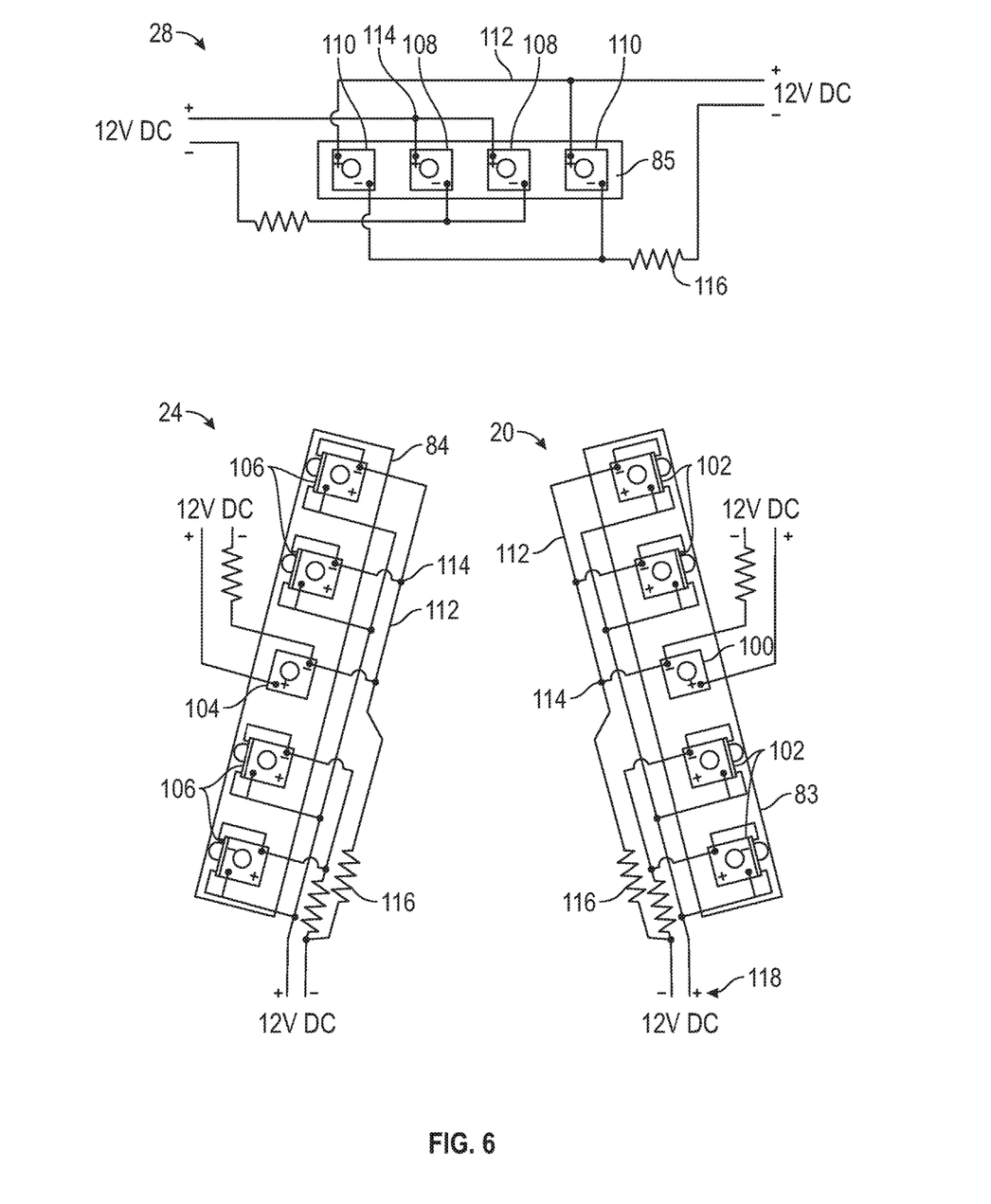
FIG. 6 is a schematic view of a right light assembly, a left light assembly, and an upper light assembly.

As shown in FIG. 6, the right light assembly 20 may include and a right blinking light 100 and a plurality of right running lights 102. Similarly, the left light assembly 24 may include a left blinking light 104 and a plurality of left running lights 106. Further, the upper light assembly 28 may include a plurality of stop lights 108 and plurality of upper running lights 110. In FIG. 6, a plurality of light sources are shown positioned vertically along the circuit boards 83/84 of the right and left light assemblies 20 and 24 with the right and light blinking lights 100 and 104 placed between the right and left running lights 102 and 106, respectively. A plurality of light sources is also shown positioned horizontally along the circuit board 85 of upper light assembly 28 with the stop lights 108 placed between the upper running lights 110. However, it should be appreciated that the blinking lights, running lights, and stop lights may be arranged in a variety of configurations.

One having ordinary skill in the art should also appreciate that the light assemblies may be hard wired or plugged into to the motorcycle's existing wiring harness. For example, the light assemblies 20/24/28 may include a plurality of wires 112 and solder joints 114 for hard wiring the light sources and a plurality of resistors 116 for preventing the light sources from being overpowered by the motorcycle's power supply, such as, for example, a 12 volts direct current (12 VDC). The soldering of wires may be connected to positive and negative terminals 118. Alternatively, the light assemblies 20/24/28 may be plugged into existing female connectors that are generally included with factoring wiring. Further, the light assemblies may be connected to the motorcycle's original right turn signal, left turn signal, running lights, and brake lights. It should be appreciated by one having ordinary skill in the art that the light assemblies 20/24/28 may be powered using a variety of electrical configurations, and the example provided herein have been provided for illustrative purposes and are not intended to limit the inventive concepts.

The lens assemblies 22/26/30 may be made of a variety of materials, including but not limited to plastic. The surfaces of the lens assemblies 22/26/30 may be smooth surfaces. However, in some embodiments, the inner surfaces and/or the outer surfaces may have a textured surface(s), or at least a portion may have textured surface(s). The texturing may be random or have a regular symmetric orientation. Typically, the texturing facilitates homogeneous, uniform lighting or otherwise provides light dispersion effects. The texturing can be provided, for example, as separate pieces (e.g., a piece of plastic or the like) or a film. The texturing can also be provided, for example, by any of a number of techniques, including molding, sand blasting, bead blasting, chemical etching, embossing, and laser ablating, as well as other forming techniques that may be apparent to one skilled in the art. The right lens assembly 22 and the left lens assembly 26 may be made of an amber color, as amber is a commonly used color for turn signal lights. The upper lens assembly 30 may be made of red color, as red is a commonly used color for brake lights.

Because the light sources 62/66/70/76 are oriented to direct beams of lights rearward, leftward, and rightward, the visibility of the motorcycle 12 may be increased. For example, the right lens assembly 22 and the left lens assembly 26 may cooperate to disperse the first, second, third, and fourth beams of light 62/66/70/76 at least 270 degrees horizontally. The placement of the light supporting portion 34 extending above the motorcycle seat 14 combined with the increased horizontal illumination may make a motorcyclist more visible to following and nearby motorists. This increased visibility may in turn enhance the safety of motorcyclists and motorists on the road.

It should be appreciated, however, that it is not necessary to orient the light sources leftward and rightward in order to achieve a desired amount of illumination. In one embodiment, the right lens assembly 22 and the left lens assembly 26 cooperate to disperse a first beam of light and the second beam of light at least 210 degrees horizontally.

From the above description, it is clear that the inventive concepts disclosed and claimed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:

1. A taillight assembly for a motorcycle having a seat, comprising:
   a support member having a mounting portion and a light supporting portion, the mounting portion mountable to the rear of the motorcycle in a way that the light supporting portion extends above the seat, and the light supporting portion having a front side, a rear side, a right side, a left side, an upper end, and a lower end;
   a right light assembly mounted to the light support portion of the support member adjacent the right side of the light support portion, the right light assembly including a first light source oriented to direct a first beam of light in a rearward direction and a second light source oriented to direct a second beam of light in a rightward direction;
   a right lens assembly mounted to the light support portion of the support member to house the right light assembly and disperse the first beam of light and the second beam of light;
   a left light assembly mounted to the light support portion of the support member adjacent the left side of the light support portion, the left light assembly including a third light source oriented to direct a third beam of light in a rearward direction and a fourth light source oriented to a direct a fourth beam of light in a leftward direction; and
   a left lens assembly mounted to the light support portion of the support member to house the left light assembly and disperse the third beam of light and the fourth beam of light,
   wherein the first light source, the second light source, the third light source, and the fourth light source are running lights.

2. The taillight assembly of claim 1, further comprising:
   an upper light assembly mounted to the light support portion of the support member above the right light assembly and the left light assembly, the upper light assembly including a fifth light source oriented to direct a fifth beam of light in a rearward direction; and
   an upper lens assembly mounted to the light support portion of the support member to house the upper light assembly and disperse the fifth beam of light.

3. The taillight assembly of claim 1, wherein the right lens assembly and the left lens assembly cooperate to disperse the first beam of light, the second beam of light, the third beam of light, and the fourth beam of light approximately 270 degrees horizontally.

4. The taillight assembly of claim 1, wherein the first light source, the second light source, the third light source, and the fourth light source are each a light emitting diode.

5. A taillight assembly in combination with a motorcycle having a seat, comprising:
   a support member having a mounting portion and a light supporting portion, the mounting portion mounted to the rear of the motorcycle in a way that the light supporting portion extends above the seat, and the light supporting portion having a front side, a rear side, a right side, a left side, an upper end, and a lower end;
   a right light assembly mounted to the light support portion of the support member adjacent the right side of the light support portion, the right light assembly including a first light source oriented to direct a first beam of light in a rearward direction and a second light source oriented to direct a second beam of light in a rightward direction;
   a right lens assembly mounted to the light support portion of the support member to house the right light assembly and disperse the first beam of light and the second beam of light;
   a left light assembly mounted to the light support portion of the support member adjacent the left side of the light support portion, the left light assembly including a third light source oriented to direct a third beam of light in a rearward direction and a fourth light source oriented to direct a fourth beam of light in a leftward direction; and
   a left lens assembly mounted to the light support portion of the support member to house the left light assembly and disperse the third beam of light and the fourth beam of light,
   wherein the first light source, the second light source, the third light source, and the fourth light source are running lights.

6. The taillight assembly of claim 5, further comprising:
   an upper light assembly mounted to the light support portion of the support member above the right light assembly and the left light assembly, the upper light assembly including a fifth light source oriented to direct a fifth beam of light in a rearward direction; and
   an upper lens assembly mounted to the light support portion of the support member to house the upper light assembly and disperse the fifth beam of light.

7. The taillight assembly of claim 5, wherein the first light source, the second light source, the third light source, and the fourth light source are each a light emitting diode.

8. The taillight assembly of claim 5, wherein the right lens assembly and the left lens assembly cooperate to disperse the first beam of light, the second beam of light, the third beam of light, and the fourth beam of light approximately 270 degrees horizontally.

* * * * *